April 24, 1928. 1,666,948
S. A. SLAUSON
TAKE-UP DEVICE
Filed Feb. 2, 1925
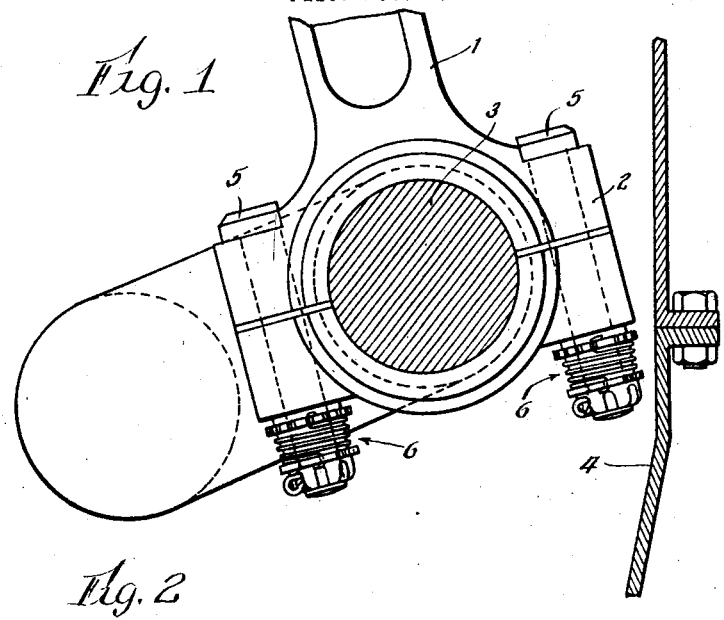
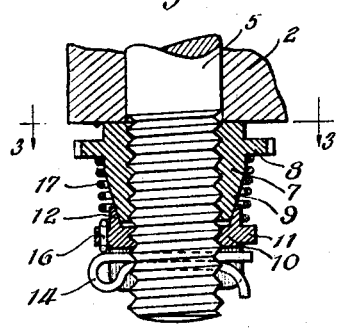
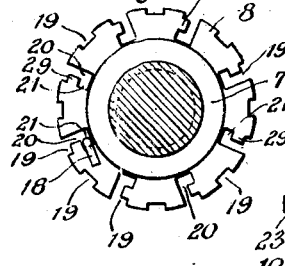
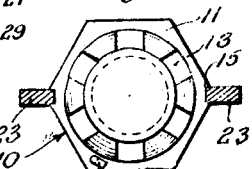
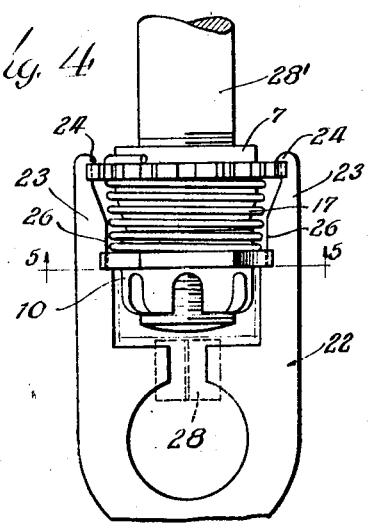
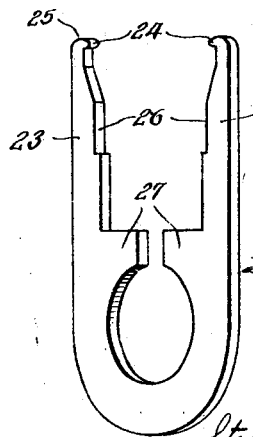

Patented Apr. 24, 1928.

1,666,948

UNITED STATES PATENT OFFICE.

STEPHEN A. SLAUSON, OF CEDAR RAPIDS, IOWA, ASSIGNOR TO VEC PRODUCTS COMPANY, OF CEDAR RAPIDS, IOWA, A CORPORATION OF IOWA.

TAKE-UP DEVICE.

Application filed February 2, 1925. Serial No. 6,167.

In a co-pending application Serial No. 709,551 filed April 28, 1924, now Patent No. 1,615,145, dated January 18, 1927, I have disclosed and claimed a take-up device for use particularly upon the connection between the crank shaft of an automobile and the connecting rod. The device therein claimed comprises a pair of telescoping nuts preferably having conical contacting surfaces, one of which is on the main nut and the other is on the lock or anchor nut. The lock nut is secured to the bolt, upon which the nuts are threaded, as by a cotter pin and the main nut is maintained tight by means of a coiled spring surrounding the two nuts and secured to both of them. The two nuts are secured together in operative relation by a key so that the entire device may be assembled and sold as a unit, the key being removed when the device is put in place upon a bolt.

It is one of the principal objects of this invention to provide a novel and improved key for use with a device of the above character and which shall have means for securely engaging the two nuts to insure that they shall be firmly held in the desired position.

Another object of this invention is to provide a key of the above character having means permitting ready insertion thereof in place wherein it will engage the two nuts, and also having means permitting ready removal thereof by means of a suitable tool.

More specifically my invention has for its object to provide a key having spring legs with rounded ends in the form of hooks, said hooks engaging in notches in the main nut and being held therein by the spring action of the legs, the rounded ends permitting the hooks to slip over the nut and engage the same. The means for removal of the key is exemplified by a narrow channel separating the two legs and of a width to permit ready insertion of a screw driver, or the like, by means of which the legs may be sprung apart.

Another object of the invention is to provide a main nut telescoping with a lock or anchor nut and having novel and improved means for co-acting with hooks on the key. This means is exemplified by notches in the periphery on a flange on said main nut.

Further objects of the invention are to provide the telescoping main nut and lock or anchor nut with a plurality of means for engagement with the coil spring which tensions the main nut; to enable the use of stock parts which can be readily assembled without the necessity of mating them to insure that the spring will be properly wound and held in place by the key so that the device may be sold as a unit; and to provide a device of the above character which shall have all the advantages set forth above and still permit the use of a standard sized lock nut so as to permit easy installation on bolts used in places where there is limited clearance, particularly on the No. 4 connection of the Ford automobile.

And a still further and important object of the invention is to provide a take-up device of the character referred to above on which the spring can be easily rewound by any person in case it becomes unwound, especially in cases where it is necessary to remove the nuts to repair or to replace the connecting rod, or anything that is attached to the connecting rod, as in such cases it will be necessary to rewind the spring when the nuts are replaced.

In the accompanying drawings in which I have shown a selected embodiment of my invention:

Fig. 1 is a view showing my invention as applied to the bearing by means of which the connecting rod of an engine is attached to the crank shaft.

Fig. 2 is a longitudinal sectional view through my invention showing the same in operative position upon a bolt.

Fig. 3 is a section on the line 3—3 of Fig. 2.

Fig. 4 is a vertical elevation showing my invention applied to a bolt and having the key in place.

Fig. 5 is a section on the line 5—5 of Fig. 4.

Fig. 6 is a perspective view of my novel and improved key.

Referring now to the drawings, the numeral 1 designates a connecting rod of an automobile engine connected by the split bearing 2 to a crank shaft 3 all within the crank casing 4. This crank casing on the Ford automobile is not usually made in such a way that it may be opened to perimt ready access to the No. 4 connection. Therefore, it has been one of the principal objects of my invention to make a device which may be readily installed on this connection, and this I have accomplished by my present invention as well as by the invention forming the subject matter of my aforesaid co-pending application.

The split bearing 2 is held in position on the crank shaft 3 by means of a plurality of bolts 5, usually arranged in pairs one on either side of the connecting rod. These bolts are held in position by means of my novel and improved take-up devices, which are designated generally by the numeral 6.

Each take-up device comprises a main nut 7, provided with the annular flange 8 and a conical surface 9. Contacting with the main nut 7 is a lock nut 10 having a flange 11 and an annular rib 12, being provided with an interior conical surface to contact with the conical surface 9 of the main nut. By providing the telescoping nuts with conical contacting surfaces, I economize space and make possible the use of a standard hexagonal size for the lock nut.

The lock nut 10 is further provided with a plurality of aligned passages 13 to receive a cotter pin, or the like 14, adapted to enter one of a plurality of passageways in the bolt 5, as set forth in my aforesaid co-pending application. The flange 11 is provided with a pair of oppositely disposed notches 15 to engage the legs of the key, as will be presently described. The flange is further provided with an aperture to receive an end 16 of the coiled spring 17, which spring is preferably of the conical form shown and described in my aforesaid co-pending application. The other end 18 of the spring 17 is received in any one of a plurality of notches in the flange 8 of the main nut. The flange 8 is provided with a plurality of recesses 19, equally spaced on the periphery of the flange and each of a size and dimensions to receive the leg of the key, as will be described presently. Certain of these recesses 19, in this embodiment every other one, is further extended toward the center of the nut as shown at 20 and terminating in an offset portion 21 for the reception of the end 18 of the spring.

In Figs. 4 and 6 I have shown my novel and improved key designated generally by the numeral 22. This key may be conveniently formed of one piece of material having the substantially parallel legs 23 terminating in turned-in hooks 24, having rounded ends 25. The key is preferably made of spring material whereby the legs may be sprung apart to permit removal from the device, the resiliency of the legs maintaining the key in place. The legs of the key are further provided with substantially parallel intermediate portions 26 shaped to enter the notches 15. Between the portions 26 and other end of the key, there are provided projections 27, the ends of which are spaced apart a suitable distance to permit the insertion of a suitable tool, such as a screw driver, for the purpose of removing the key from the device after it is placed in position. Such a tool is shown in dotted lines at 28 in Fig. 4. The recesses 15 and 19 are of such a width as to receive the key snugly and yet to permit ready removal therefrom when desired.

In operation the device may be assembled upon any suitable bolt as 28' shown in Fig. 4. The main nut 7 is placed on the bolt and then the lock nut may also be placed thereon together with the coiled spring, the ends of the spring being engaged with the lock nut and with any one of the notches provided therefor in the main nut. Rotation of the main nut in respect to the lock nut will then result in tensioning the spring, and when the spring has been sufficiently tensioned, the key 22 is applied, being received in the recesses 15 and 19. It is noted that any one of the recesses 19 will do to receive the key because of the fact that even the recesses, which have been further extended to provide means for receiving the spring, still have a lug 29 extending thereinto to prevent entry of the legs 23 of the key into the extension 20 and to furnish a sufficient bearing for engagement with a leg 23. The inner points of the hooks 24 are spaced apart a distance slightly less than the distance diametrically across the flange 8 at a pair of notches 19, and therefore when the key is inserted in place, the legs are sprung outwardly and then snapped back into position engaging the flange at diametrically opposite points. This action is made possible by the rounded ends 25 of the legs.

When the key has been inserted, it will be seen that the device is securely held with the spring at the desired tension, relative rotation of the lock nut and main nut being prevented by engagement of the key in the recesses 15 and 19. The device may then be removed from the bolt 28' and sold as a unit. The threads of the two nuts will form one continuous thread, so that the device may be readily applied to a bolt where it is intended to be used. The key may then be removed by insertion of a suitable tool 28 between the projections 27. The lock nut is, of course, secured in place by a cotter pin or the like 14, and then as the bearing wears the main nut will be automatically rotated by the spring 17 to take up the wear, thus preserving the bearing always tight. Even though the spring 17 should break or become detached, the conical contacting surfaces will hold the main nut in position and comparatively tight. Moreover, as pointed out above, the conical telescoping surfaces economize space to such an extent as to make possible the retention of a standard sized lock nut. The present tendency is to economize space in engines and devices of all kinds where a take-up device is used and by my invention I make possible the use of a thoroughly efficient take-up device, which may still be made within the limits of a standard sized lock nut, so that it may be readily applied to existing standard structures.

Moreover, by providing one of the nuts with a flange, having a plurality of recesses therein, any one pair of which may be used to engage the key, I make it possible to use any lock nut with any main nut, without the necessity of mating them to insure registry of the key engaging means on the two nuts. The extensions of the recesses 19, which are made to receive the end of the spring, are very easily made. In manufacturing the nut, the recesses 19 are all cut in one operation and then the extensions 20 and 21 may be successfully made in succeeding operations. By having the plurality of means for engaging the end of the spring with one of the nuts, the flexibility of the device is greatly increased and the ease of assembly is also facilitated.

The nut 10 may be considered more properly a spring anchor nut than a lock nut, but it also serves the purpose and takes the place of a lock nut and for that reason I have used this term in general reference thereto in the specification and the claims, even though it is not customary to turn up this nut as tightly against the main nut as a lock nut is ordinarily tightened against its main nut.

I am aware that changes in the form, construction and arrangements of parts may be made without departing from the spirit and without sacrificing the advantages of the invention and I reserve the right to make all such changes as fairly fall within the scope of the following claims.

I claim:—

1. A take-up device comprising a main nut, a lock nut, a spring connected to said nuts, and a key having legs engaging said nuts to hold them in position and terminating in hooks turned inwardly to engage one of said nuts, said hooks being provided with rounded ends to permit snapping of said hooks into position.

2. A take-up device comprising a main nut, a lock nut, a spring connected to said nuts, and a key having resilient legs engaging said nuts to hold them in position, said key being provided with means for permitting said legs to be sprung apart to release said key.

3. A take-up device comprising a main nut, a lock nut, both adapted to fit the same bolt, a spring connected to said nuts and tending to cause relative rotation therebetween, a key for engaging the nuts simultaneously, a single means on one of said nuts, a plurality of means on the other of said nuts, each of said means adapted to be engaged by said key to retain the nuts in various relative positions against the tension of the spring.

4. A take-up device comprising a main nut, a lock nut, both adapted to fit the same bolt, a spring connected to said nuts and tending to cause relative rotation therebetween, a key for engaging the nuts simultaneously, a single means on said lock nut and a plurality of means on said main nut, each of said means adapted to be engaged by said key to retain the nuts in various relative positions against the tension of the spring.

5. A take-up device comprising a main nut, a lock nut, and a key comprising resilient legs terminating in inturned hooks engaging one of said nuts, to hold it against axial movement in respect to the other nut, and provided with substantially parallel intermediate portions engaging the other of said nuts to prevent relative rotation of said nuts, said legs being provided with projections extending toward one another and having their ends spaced apart to permit the insertion of a tool.

6. A take-up device comprising a main nut, a lock nut, a spring having its ends connected respectively to said nuts and tending to cause relative rotation therebetween, a key to prevent such relative rotation, one of said nuts being provided with a plurality of means to receive said key, and with a plurality of means to receive one end of said spring and the other nut being provided with means to receive said key and with means to receive the other end of said spring.

7. A take-up device comprising a main nut, a lock nut, each of said nuts being provided with flanges, one of said flanges having a pair of substantially diametrically opposite recesses therein, and the other of said flanges being provided with a plurality of pairs of diametrically opposite recesses, all of said recesses adapted to receive the legs of a key, and a spring connected to said nuts and tending to cause relative rotation therebetween.

8. A take-up device comprising a nut having a flange thereon, said flange being provided with a plurality of recesses extending inwardly from the periphery thereof, said recesses being arranged in pairs, the recesses in each pair being substantially diametrically opposite to each other and providing means to receive a key, certain of said recesses being extended further inwardly from the periphery of the flange and formed to receive an end of a spring.

9. A take-up device comprising a main nut, a flange on said main nut, said flange having a plurality of key-receiving notches all of the same depth and form and arranged in pairs, the notches in each pair being arranged diametrically opposite to each other, a lock nut, a spring having one end engageable with said lock nut and the other end engageable with the flange of said main nut, and a key engageable with said lock nut and said key receiving notches and holding both of said nuts in relative position.

10. A take-up device comprising a main nut, a flange on said main nut, said flange having a plurality of key-receiving notches all of the same depth and form and arranged in pairs, the notches in each pair being arranged diametrically opposite to each other, and a lock nut telescoping the said main nut and having a single pair of oppositely disposed notches adapted to be brought into alignment with any one of the pairs of notches in said main nut.

11. A take-up device comprising a main nut, a flange on said main nut, said flange having a plurality of key-receiving notches therein all of the same depth and form and arranged in pairs, the notches in each pair being arranged diametrically opposite to each other, a lock nut having a shoulder, said shoulder having a pair of oppositely disposed notches adapted to be brought into alignment with any one of the pairs of notches in said main nut.

12. A take-up device comprising a main nut, a lock nut, both adapted to fit the same bolt, a spring connected to said nuts and tending to cause relative rotation therebetween, a key for engaging the nuts simultaneously, a single means on the periphery of one of said nuts, and a plurality of means arranged around the periphery of the other of said nuts, each of said means adapted to be selectively engaged by said key to retain the nuts in various relative positions against tension of the spring.

13. A take-up device comprising a main nut, a lock nut, both adapted to fit the same bolt, a spring connected to said nuts and tending to cause relative rotation therebetween, a key for engaging the nuts simultaneously, a single means on the periphery of said main nut, and a plurality of means arranged around the periphery of said lock nut, each of said means adapted to be selectively engaged by said key to retain the nuts in various relative positions against tension of the spring.

14. A take-up device comprising a nut having a flange thereon, said flange being provided with a plurality of recesses extending inwardly from the periphery thereof, said recesses being arranged in pairs, the recesses in each pair being substantially diametrically opposite to each other and providing means to receive a key, certain of said recesses having substantially L-shaped portions extending further inwardly from the periphery of the flange to receive an end of a spring.

STEPHEN A. SLAUSON.